H. BERNSTEIN.
REINFORCING PLATE FOR AUTOMOBILE BUMPERS.
APPLICATION FILED MAR. 9, 1921.
1,397,354.
Patented Nov. 15, 1921.
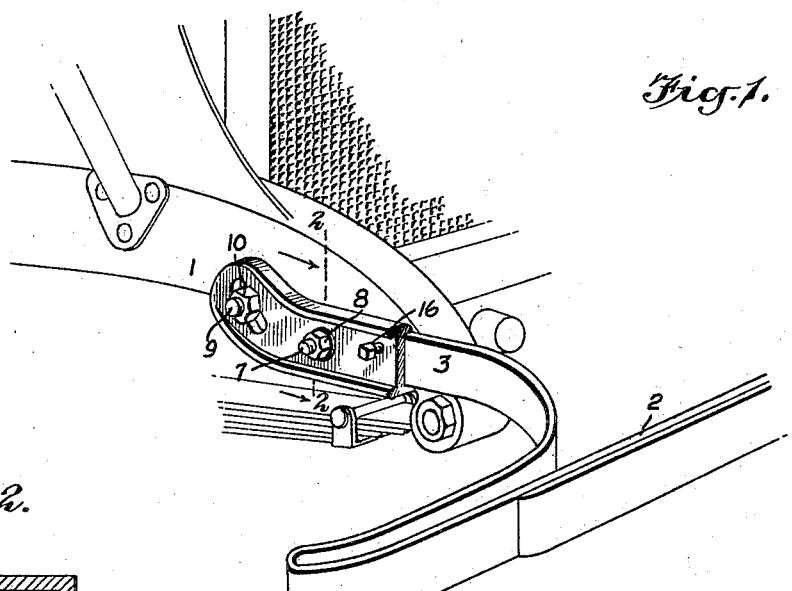
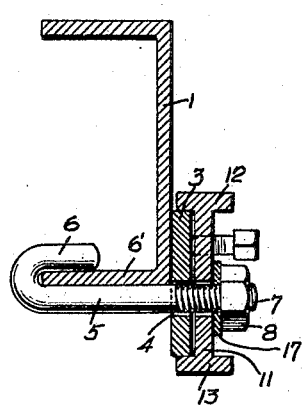
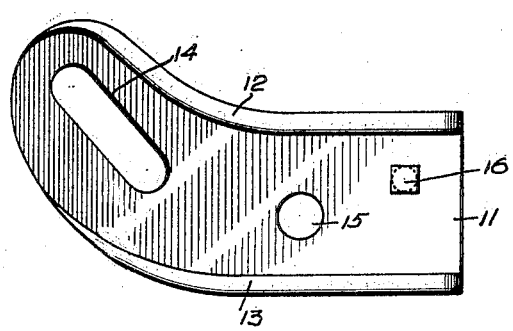
WITNESSES
INVENTOR
HARRIS BERNSTEIN
BY
ATTORNEYS

UNITED STATES PATENT OFFICE.

HARRIS BERNSTEIN, OF NEW YORK, N. Y.

REINFORCING-PLATE FOR AUTOMOBILE-BUMPERS.

1,397,354.  Specification of Letters Patent.  Patented Nov. 15, 1921.

Application filed March 9, 1921. Serial No. 451,037.

*To all whom it may concern:*

Be it known that I, HARRIS BERNSTEIN, a citizen of the United States, and a resident of the city of New York, borough of Manhattan, in the county and State of New York, have invented a new and Improved Reinforcing-Plate for Automobile-Bumpers, of which the following is a full, clear, and exact description.

This invention relates to a reinforcing device for automobile bumpers. An object of the invention is to provide a simple, strong, economically manufactured and readily applicable reinforcing device adapted for use in connection with automobile bumpers for the purpose of eliminating the tendency of bumpers to break and crack along those portions of the bumpers which are adapted to be attached to the body or frame of the automobile with which the bumpers are used.

Another object resides in the provision of a reinforcing plate so constructed as to furnish the required auxiliary strength and at the same time permit of the ready adjustment of the bumper in any desired position.

A further object resides in the particular construction and arrangement of parts which are hereinafter described and claimed and shown in the accompanying drawings.

The invention is illustrated in the drawings, of which—

Figure 1 is a partial perspective view of the front portion of the frame of an automobile showing the bumper and reinforcing plate applied;

Fig. 2 is a section taken on the line 2—2 of Fig. 1; and

Fig. 3 is a side view of one of the reinforcing plates.

The preferred embodiment of my invention, as illustrated in the drawings, is adapted to be applied to the end of the frame of an automobile, particularly to the chassis beams, such as are designated by the numeral 1. The bumpers with which my device is particularly useful are in the form of curved spring plates such as 2 having end portions 3 which are adapted to be connected to the ends of the chassis beams 1 in a manner hereinafter to be described. Each of the end portions 3 of the bumpers is provided with an aperture 4 through which the shank 5 of a clamp is adapted to extend. This clamp is provided with a hook portion 6 which is adapted to engage with a flange portion such as 6' of the chassis beam 1. The other end 7 of the shank 5 is threaded and adapted to receive a nut such as 8. Ordinarily the ends of the bumpers are in this manner held against the chassis beams 1. The extreme outer portions of the ends 3 of the bumpers are provided with a tapered slot (not shown) through which a shank 9 of a hook clamp extends and with which clamp a nut 10 is adapted to coöperate. This hook clamp is similar to the one just above described and coöperates with the chassis beam 1 to hold the outer end of the bumper in the desired position. By reason of the tapered slot the position of the bumper can be adjusted in a manner well known in the art. Both of these hook clamps and their coöperating devices have hitherto been used alone to hold the bumper plates against the chassis bars.

Under these circumstances, however, it has been found that when undue stresses have been applied to the bumpers they tend to crack vertically, especially along the line through the aperture 4. It has been found that this tendency may be eliminated by the application to this portion of the bumpers of a reinforcing plate, to be hereinafter described. These plates not only prevent new bumpers from being cracked but will reinforce and strengthen the bumpers which have already cracked so that their period of usefulness may be considerably lengthened.

My invention comprises a curved plate 11, made preferably of cast or wrought iron, having upper and lower longitudinal flanges 12 and 13 which thus provide channel portions on each side of the plate. The channel portions and the plate are curved in a manner similar to the curvature of the ends of the bumpers with which the plate is to be used. The outer ends of the plates are provided with sloping slots such as 14 which, when the plate is in position, are alined with similarly shaped slots, above mentioned, in the ends of the bumper plates. An aperture such as 15 is provided to aline and register with the aperture 4 in the bumper plate above mentioned. The reinforcing plate is also provided with an aperture through which an adjusting set screw 16 may project.

As shown in Figs. 1 and 2, the ends 3 of the bumper plate are placed against the chassis beams as desired, and over these portions the reinforcing plate is placed until the slots and the apertures are in alinement. The hook clamps passing through the slots and the apertures are then placed in position and the nuts coöperating therewith are tightened up, as shown in Figs. 1 and 2, to bear against the reinforcing plate 11. Suitable washers such as 17 may be provided beneath the nuts. When the nuts 8 and 10 have been tightened up, the set screw 16 may be adjusted to force that portion of the bumper plate with which it contacts firmly against the chassis beam. This additional adjustment will make the bumper plate along this portion extremely rigid, and when undue stresses are applied to the plate it will not be subject to any deflections, which hitherto have caused it to crack.

It is, therefore, readily perceived that I have produced a simple, economically manufactured, compact and readily applicable device for reinforcing the ends of bumper plates along those portions thereof where they are attached to the frame of an automobile and thereby eliminated the tendency for these portions of the bumpers to break.

What I claim is:

1. The combination with an automobile frame member and a bumper plate adapted to lie along the same and be attached thereto, of a reinforcing plate adapted to be placed in contact with and along the outer face of the end portion of the bumper plate, and means for gripping the bumper plate between the frame member and the reinforcing plate.

2. The combination with an automobile frame member and a bumper plate having an end portion adapted to lie along and be connected to the frame member, of a channel reinforcing plate adapted to be disposed along the outer face of the end portion of said bumper plate, said channel plate having a curvature corresponding to the curvature of the end of the bumper plate, and means for clamping the bumper plate between the reinforcing plate and the frame member.

3. The combination with an automobile frame member and a bumper plate having end portions adapted to lie along and be fastened to the frame member, said bumper plate having a plurality of apertures in its end portion by means of which it can be fastened to the frame member, a channeled reinforcing plate having a plurality of apertures therein disposed similarly to the apertures in the bumper plate and having a curvature similar to the curvature of the ends of the bumper plate, and means for fastening the reinforcing plate and the ends of the bumper plate together against the frame member.

4. A reinforcing device for automobile bumpers having curved end portions and a plurality of fastening apertures therein, which comprises a channel plate having a curvature similar to the curvature of the ends of the bumper plate and having a plurality of apertures therein corresponding to the apertures in the ends of the bumper plate, said reinforcing plate adapted to be placed against the bumper plate when in position to reinforce the same.

5. A reinforcing plate for automobile bumpers, which comprises a channel plate having a plurality of apertures therein corresponding to apertures in the ends of the bumper plate with which the reinforcing plate is adapted to coöperate, and a set screw in the reinforcing plate adapted to adjust and to engage with the ends of the bumper plate to hold the same in a predetermined position.

HARRIS BERNSTEIN.